2,847,310

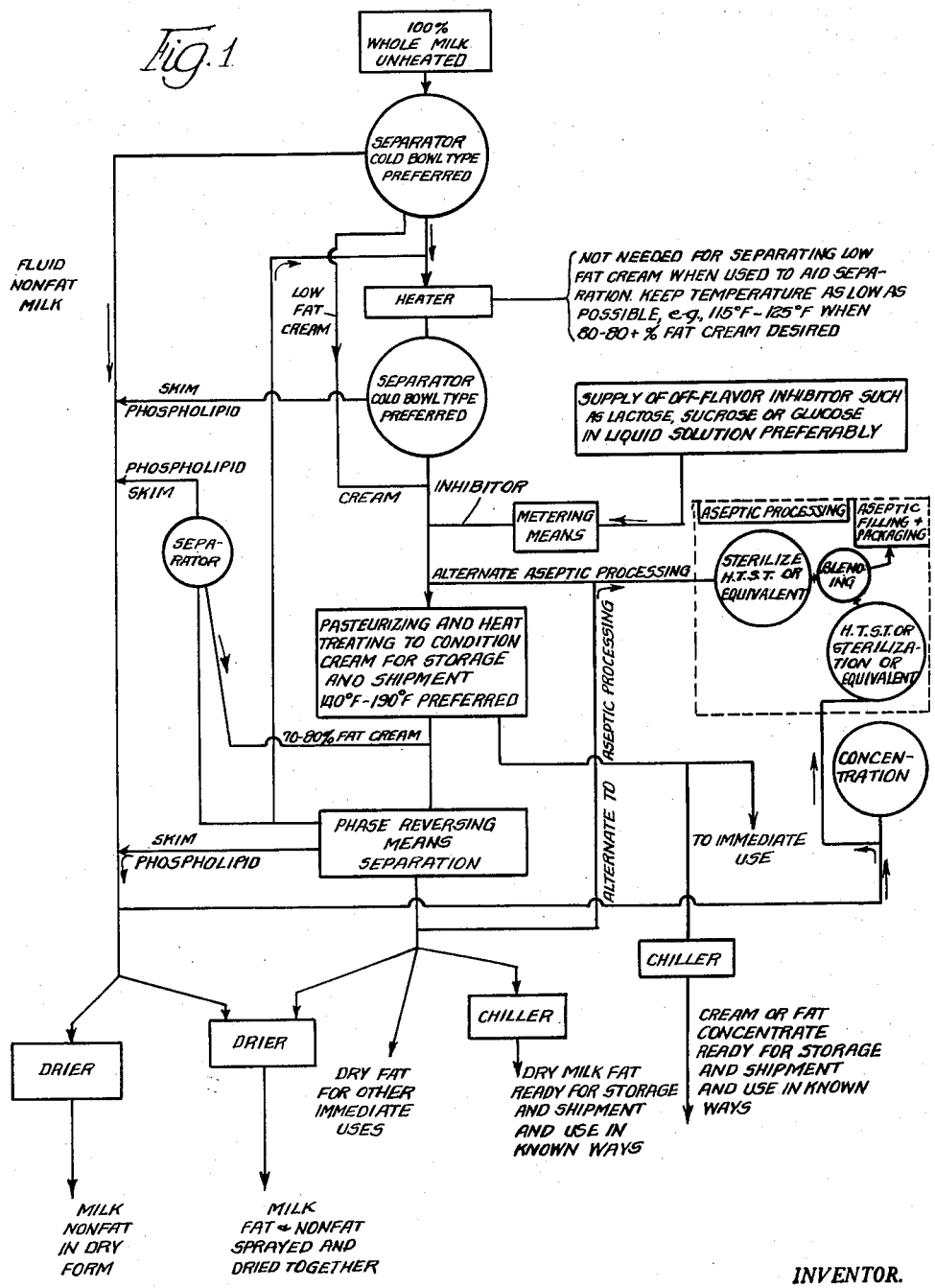

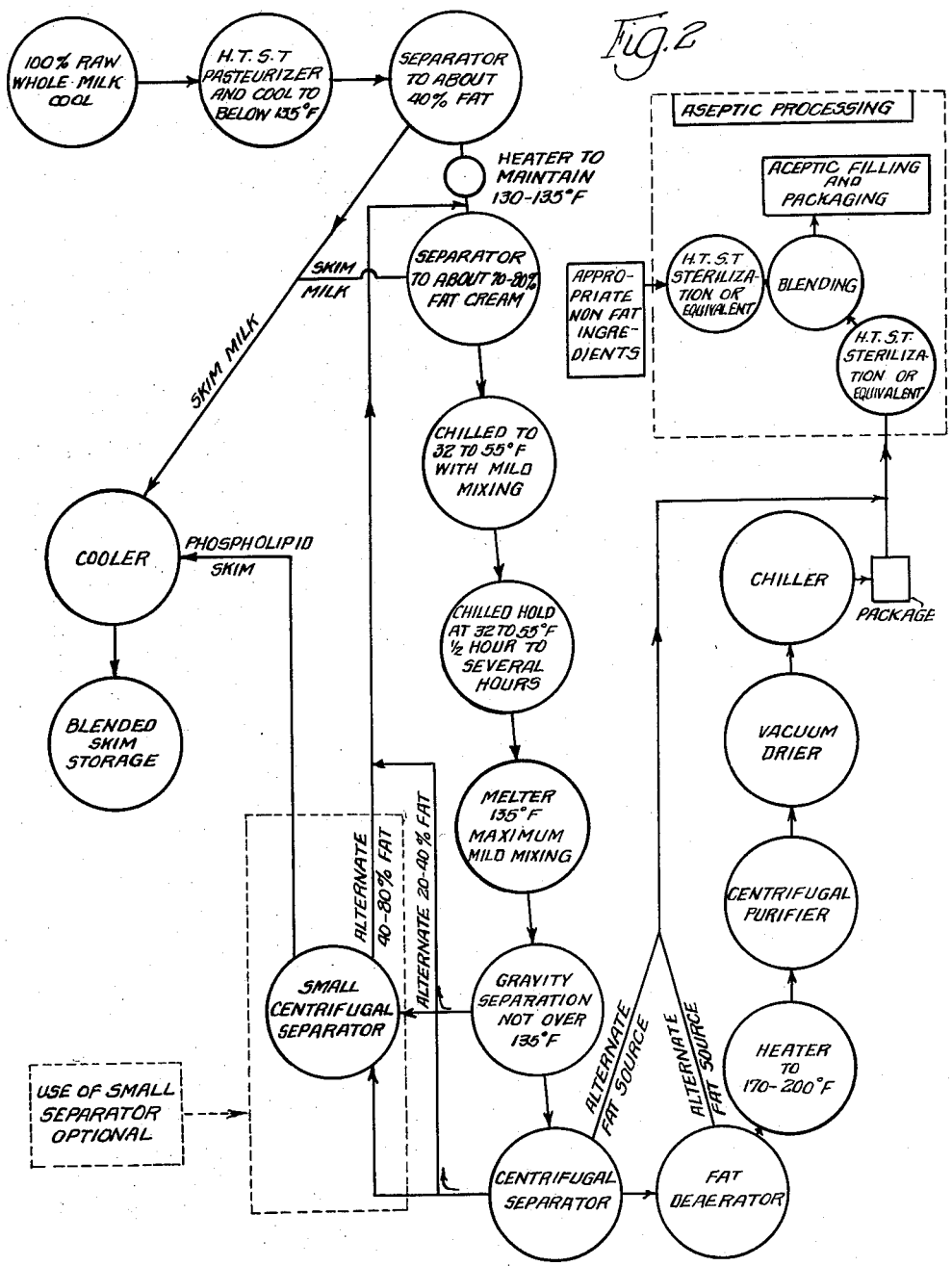

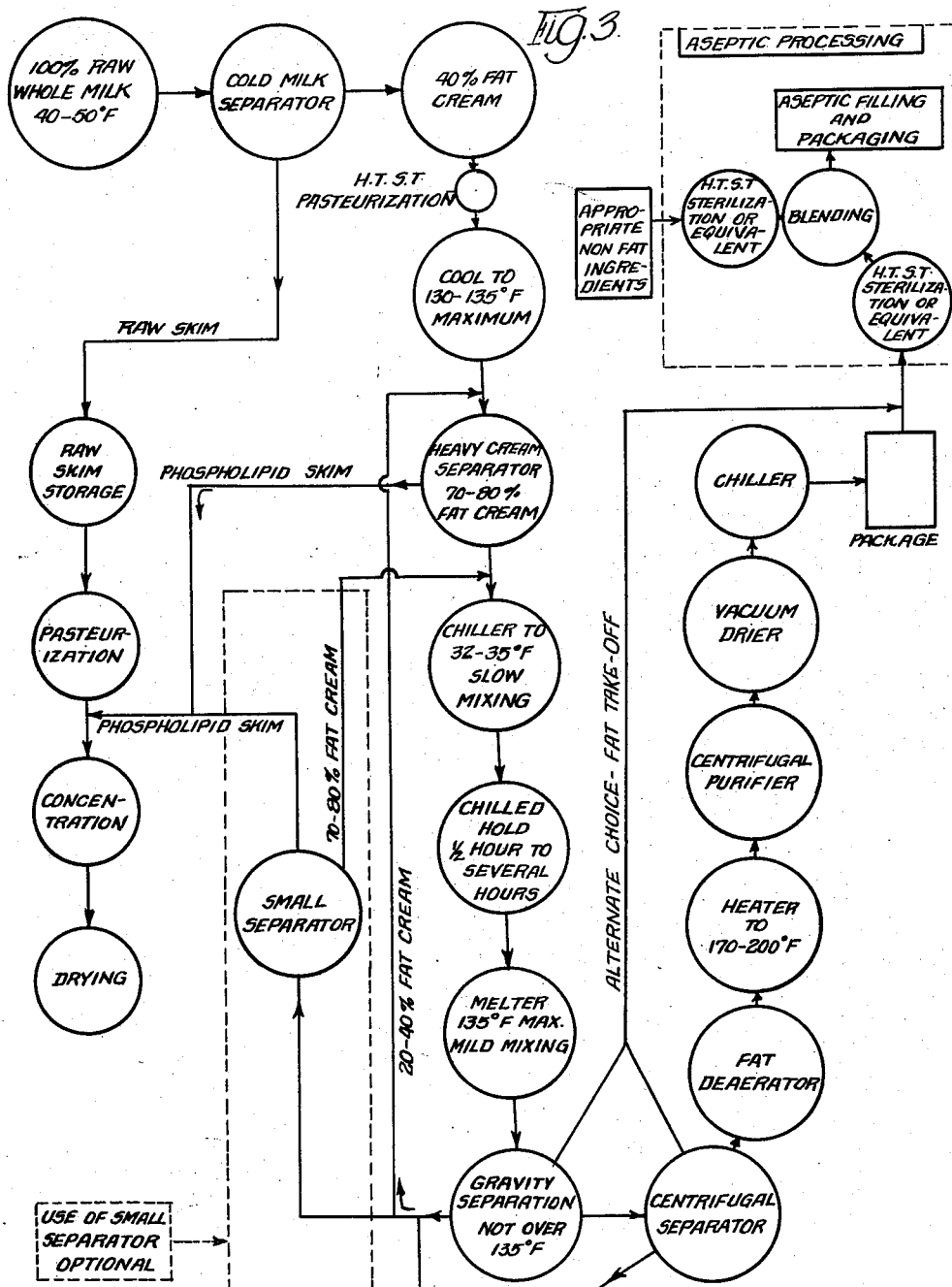

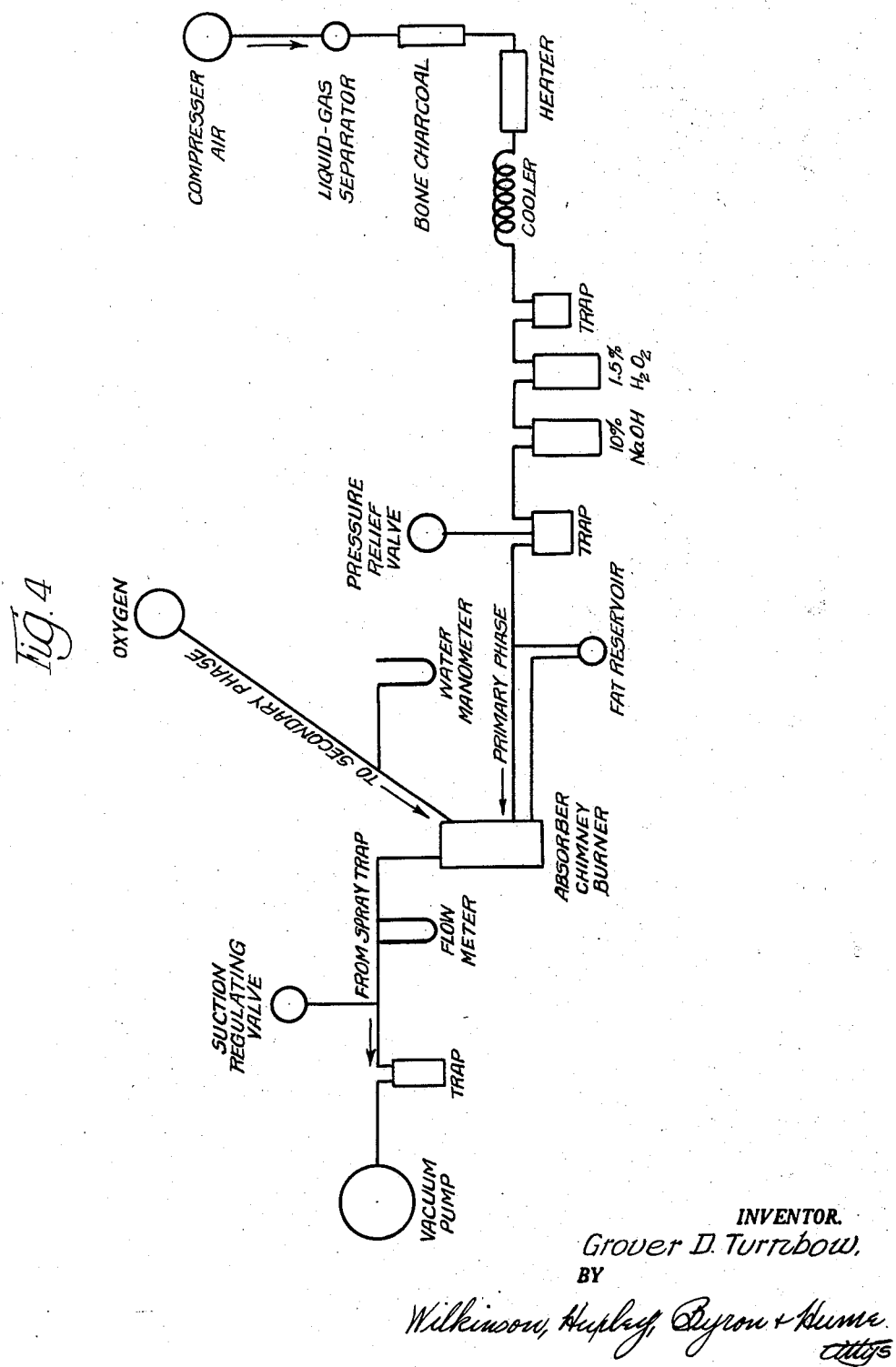

PROCESSES FOR PRESERVING THE FRESH NATURAL FLAVOR OF BUTTERFAT AND PRODUCTS PRODUCED THEREFROM

Grover D. Turnbow, Piedmont, Calif., assignor to Foremost Dairies, Inc., San Francisco, Calif., a corporation of New York Application March 17, 1955, Serial No. 494,864

18 Claims. (Cl. 99—54)

My invention relates to methods and the products thereof for producing dry milk fat or a cream or fat concentrate suitable for use in making recombined or reconstituted milk products, or products in which milk in one form or another is used as an ingredient, and a method of analysis thereof.

The present invention is an improvement of the processing disclosed in my Patent No. 2,673,155.

The principal object of the invention is to provide methods (and product) whereby a fresh milk product can be reduced to components in a dry or a concentrated state, shipped and stored for indefinite periods, and then be reconstituted or recombined to make normal milk, evaporated milk, chocolate milk, cream, ice cream, cheddar cheese and other milk products without any of these having a flavor substantially different than if made with fresh milk.

Another object is to provide improved fluid milk, evaporated milk, chocolate milk, cream, ice cream, cheese, cheese foods and the like in sterile state with flavor improved beyond the degree that so far has been achieved in the art.

The problem in the past has been that products reconstituted or recombined from various milk components (usually in dry form) will have a flavor noticeably different than the flavor of fresh milk or products made from milk in its fresh state. These flavors normally result from the heat processing to which such products are necesarily subjected and in the trade these are referred to as "off-flavor," "cooked-flavor," "stale-flavor," and the like. These off-flavors have been the biggest deterrents to general acceptance of such products.

The need for such high quality components which may be recombined at the point of use to make a product as acceptable in flavor as that of the original fresh milk product has been demonstrated forcefully in the recent war and occupation of countries, such as the Orient, where fresh dairy products have not been available. An additional advantage is the substantial economy in storage and transportation costs which can be realized in the domestic market if an acceptable recombined or reconstituted product can be made at the point of consumption, because of the concentration and relative imperishability of the ingredient prepared for that purpose.

There are several ways of achieving the results of the invention, as outlined briefly above. I illustrate these on the flow charts shown in Figures 1, 2, and 3.

Briefly (see Flow Chart, Figure 1), the object is to divide the fresh unheated whole milk as received from the producer into component parts, impart to each a keeping quality without loss of palatability, and subsequently bring these component parts together, mix them with suitable water perhaps at a distant future and location to produce a reconstituted or recombined product having a flavor quality and nutritional value equivalent to the original whole milk. The same teaching applies where various of these components may be used as such in the manufacture of other products such as candy.

To achieve the objects of this invention, I prefer to start (Flow Chart, Figure 1) with fresh unheated whole milk as received from the producer (the dairy) and before the milk has been subjected to heat at all, even before pasteurization. Starting with the cold, whole milk, I prefer to separate the milk by means of a cold bowl separator or separators (or some other form of separators) to provide cream containing preferably as high as 80+% fat, or an even higher fat content, and to provide fluid nonfat milk which may be processed for any particular purpose desired.

As shown on the Flow Chart, Figure 1, if the cream concentrate desired is to be relatively low in fat content, that is in the neighborhood of 40% or less fat, then separation may be accomplished without heating and the cream can by-pass any other separating apparatus provided.

The use of a heater at present seems preferabl in connection with separating the fat and nonfat components where it is desired to obtain a fat having more than 40% fat content. In this heater the preferred top temperature range is 115° F. to 125° F. to obtain an 80+% fat. The temperature should be kept as low as possible and still give the desired percentage of fat and nonfat separation.

The use of cold bowl separators is preferred only because I want to handle the milk at as low temperatures as is practical until certain acceptable food substances which will prevent the deterioration in flavor quality of the fat have been added. These substances I refer to as inhibitors or off-flavor inhibitors.

This invention has to do primarily with the processing of the cream or fat of the milk into a concentrated form possessing a much greater degree of excellence of ffavor than is now possible with existing methods for pasteurization and subsequent processing to finished product. To accomplish this objective, I add to the cream or cream concentrate sufficient of an off-flavor inhibitor, in the form of a concentrated lactose solution, to give about 12% by weight added lactose in the water phase of the cream, before the cream is subjected to heat treatment and pasteurization. I may substitute other inhibitors such as sucrose, or glucose, or other sugars or mixtures of sugars with higher sweetening effect when it is advantageous to do so. The inhibitor may be dissolved in a suitable carrier such as water or nonfat milk for metering into the cream before processing temperatures have risen substantially. It is important that the off-flavor inhibitor be mixed in before the cream reaches a temperature that is injurious to the flavor. The cream is then subjected to pasteurizing and heat treating to the desired temperature. With the off-flavor inhibitor present at the time of heating, the fat of the cream seems not to take on any objectionable off-flavor.

For pasteurization and heat treating I have found that temperatures which are carefully controlled in the 140° F. to 190° F. range are preferable. The temperature chosen will depend upon the kind of equipment used and whether it is of the batch type or of the continuous plate type or some other type. The temperature should not be any higher or be maintained for any longer period of time than is necessary. The temperature used may be higher than necessary for pasteurization and will be influenced by the length of time the product is expected to be held in storage or to be in shipment, how it is to be stored and the purpose for which it is to be used. The longer the storage time is to be, the higher the temperature that should be used. These temperatures may be in excess of the legal minimums prescribed for pasteurization.

Where the inhibitor is to be employed in the step of separate sterilization of the fat concentrate stream, the high temperature short time principle of sterilization is much preferred, that is, temperatures at least as high as 250° F. and up to a maximum of 300° F. or higher with the corresponding required times necessary to provide the desired $F_o$ which will usually be not lower than five and not greater than twenty.

After the pasteurization and heat treating is accomplished the procedures commonly employed by the industry are used to concentrate, or if desired, to dry the fat. This finished product, whether as a cream concentrate or as a dry fat, is unique in imparting a very superior flavor when used in finished products or recombined as fresh milk, and in not containing significant amounts of products which usually result from heating milk and which do impart undesirable off-flavors to the finished cream or products in which used.

The amount of skim milk (with the added off-flavor inhibitor) in the cream is very small compared to the total skim milk content of the original milk, and when separated from the fat in a phase reversing means and separator may, if desired, be returned to the main portion of the nonfat milk intended for concentration and/or drying for premium nonfat uses. When lactose is used as the off-flavor inhibitor the lactose content of the total nonfat solids is thus increased by only about 1.5%, which is little if any more of a change in lactose content than the variation naturally occurring in milk throughout the period of lactation or from individual cows.

The skim milk usually passes through to a storage tank after which it receives the heat necessary for pasteurization treatment and then it is evaporated to reduce the water content to approximately 50% or 60% after which it is spray dried to produce a powder for packaging and transportation. This final powder contains not over 3% moisture for optimum keeping quality. The powder is packed in sealed containers which require no refrigeration and are adapted to be shipped under any conditions.

The skim milk instead of being dried as aforesaid may be handled in other ways as I shall point out hereinafter.

If the treated cream is used for making a cream or fat concentrate with a high or low fat content, it is not absolutely necessary to separate out the off-flavor inhibitor and the nonfat milk before making the concentrate.

If cream in the neighborhood of 80+% fat is to be processed, I propose to meter into this cream an off-flavor inhibitor such as lactose, glucose, or sucrose in the range of 1½ to 3 pounds of inhibitor per 100 pounds of cream, depending upon the original composition of the milk. This mixture is treated at the usual legally prescribed pasteurization temperatures, and in most cases at higher temperatures as explained heretofore.

Where it is desired to treat a cream in making products other than anhydrous fat, the fat content may or may not be as high as 80+% or higher. To make such a cream concentrate the quantity of off-flavor inhibitor added is increased in proportion to the increased amount of skim milk solids present in the cream. For example, in treating a 40% fat cream, I would add approximately triple the amount of inhibitor specified for treating an 80+% fat cream, and in a 50% fat cream, I would use about 2½ times as much inhibitor, or about 4 to 8 pounds and about 3 to 6 pounds respectively per 100 pounds of cream. These percentages are given for illustration. They are not limiting as they are not the only percentages which will achieve the desired results. The percentage of off-flavor inhibitor added will decrease proportionately as the fat content of the cream is increased. The aim is to use as little inhibitor as possible and yet prevent production of the undesired off-flavor in the cream concentrate and in the products in which it is subsequently incorporated.

As shown in the Flow Chart in Figure 1, the fat concentrate in the form of 40% cream plus inhibitor, 80+% cream plus inhibitor or polished or gravity separated oil, may be subjected to the appropriate heat treatment for pasteurization, destruction of enzymes, or sterilization and metered after suitable cooling by means of a separate metering device and made to merge with the nonfat phase of the desired composition and which has been subjected just previously to the desired heat treatment. The streams are caused to merge in the desired proportions and rendered homogeneous after which the blended product may be suitably cooled further and filled into sterilized containers of any appropriate kind.

An alternate process, achieving some of the above objectives but less versatile than that shown in the Flow Chart in Figure 1 is set forth in Flow Charts in Figure 2 and Figure 3. These latter two alternative processes are less preferred because they are less versatile. Heat treatment of the creams without the presence of the inhibitor is limited to very low heat treatments adequate only for conventional pasteurization effects, before phase separation, or else the flavor of the fat heated in the presence of the serum solids of the cream will be noticeably injured.

Sometimes the milk enzymes, such as lipase and possibly oxidases, will in certain seasons of the year be hard to destroy adequately at the temperature and time limit for damage to flavor. These alternate procedures are less desired too because they are more difficult to operate as continuous operations because of the chilled storage step which interrupts the process flow, for at least a few hours.

The melting process in these alternate procedures requires very careful control in order not to overheat melting portions of the cream during the process; otherwise, local overheating above the temperature of 135° F. for only minutes will impart undesirable heated flavor to the fat in proportion to the time and temperature of the over exposure to the heat.

In processes disclosed in Figures 2 and 3, also, the alternate possibility of using the 40% to 80+% creams by adding inhibitor when desired and subsequently heat treating, sterilizing and reincorporating with other ingredients is advocated in order that, when the occasion requires, the creams may be heated further with the presence of the inhibitor along with the serum solids.

I further prefer the process shown in Figure 1, using an inhibitor, for the reason that the higher working temperatures and times permitted allow higher temperatures in the gravity separator and polisher so that a high production efficiency can be more readily achieved when producing the purified fat or the purified and dried fat. Furthermore, the process using the inhibitor allows me more flexibility of use, since, if I wish, I can interrupt my process at the 40% fat cream stage or at the 80+% fat stage, add my inhibitor in the quantities set forth, heat treat or sterilize, if I desire to do so, and return the fat concentrate to blend as I wish with other ingredients, or to chill and store for later use.

My investigation as to the reason why unheated fat and fat made with the benefit of the inhibitor have a noticeably natural flavor, whereas fat made by conventional processes with high heat treatments carry tell-tale heated fat flavor, has been difficult of accomplishment. However, I have now been able to establish certain significant facts which allow me to determine my product chemically as well as organoleptically.

I have believed from my earliest observations that sulfur compounds are involved in the acquisition of the off-flavor in milk fat made by conventional methods, and have attempted to determine by chemical evidence of differences in amounts of volatile compounds, and particularly-difficult-to-detect volatile sulfur-containing compounds in finished anhydrous milk fat, whether or not such fat was made by means of my inhibitor. Chemical evidence indicated that sulfur compounds were not disappearing from the serum when the inhibitor was used.

It appeared that without the inhibitor present the sulfur compounds were entering the fat and becoming chemically bound in such a way as to prevent their measurable volatilization from the fat. Apparently when this happens the fat takes on or acquires a flavor quality which I described as off-flavor caused by heat.

Finally, by completely burning the fat and measuring the evolved sulfur from the complete combustion of a sample of fat, it proved to be possible to measure the very small amounts of sulfur that are contained therein. A suitable method directly applicable to this analysis required months of effort to develop and to perfect.

Direct ashing of the fat as for copper determinations and the like proved to be futile. The Parr bomb ashing technique seemed undesirable, so that another means of accomplishing an ultimate analysis was sought. The lamp volumetric method used in the petroleum industry to measure sulfur in fuels and oils was tried. However the early trials with the standard equipment revealed that the milk fat could not be fed through the wick even at very high temperatures of the fat which would tend to reduce viscosity and encourage movement up the wick.

After a number of trials it was found possible to burn the fat successfully by surrounding the base of the flame portion of the wick with a well of fat that could be fed from a reservoir. By this means sufficient sized samples were burned in a controlled air-oxygen mixture. The sulfur evolved from the flame was absorbed by conventional solutions and the sulfate resulting from oxidation by bromine was titrated with $BaCl_2$ with potassium rhodizonate indicator. Large differences in the sulfur content of different fats began to appear. However, with this arrangement for feeding the flame the intensity of the heat from the burning flame was difficult to control.

Therefore, the flame would occasionally go out of control and create enough heat to melt the glass equipment. In order to analyze the number of samples required it became necessary to further refine the method to permit better control of the combustion. In addition, it was found that some people could not recognize accurately the cherry red end point in the titration of the sulfate with $BaCl_2$ using rhodizonate as the indicator. Further modification of the method has been found necessary. The method as used to secure the results set forth later is as follows:

The fat to be analyzed is first prepared by removing the last traces of curd by centrifugation followed by filtration through a Buchner funnel at 200° F. The fat is centrifuged at 2000 R. P. M. using an 11-inch head. The centrifuged and filtered fat is ready for combustion.

The method used for burning the fat is most nearly like that of the ASTM "Tentative Method of Test for Sulfur in Petroleum Products by the Lamp-Gravimetric Method," design D90–50T, in "ASTM Standards" 1952, part 5, pages 21–27.

*Combustion and absorption apparatus (see drawing, Figure 4).*—The general construction of the combustion and absorption apparatus is like that described in the ASTM reference just cited. However, the arrangement for the reservoir for the melted oil is modified, because the fat will not saturate the wick by capillary action alone.

The following equipment was substituted. The first section which fits on the lower end of the burner, consists of a 14/35 round glass joint (with tube of O. D. 11 mm.) and bent 65 mm. from the tip of the joint at a 90° angle. At about 30 mm. from this bend, the tubing is cut. The second section consists of a 25 ml. Erlenmeyer flask to which is continuous with the chamber of the flask, a 25 mm. strip of glass tubing of O. D. 7.5 mm. The first and second sections are then connected by a 170 mm. length of Tygon tubing of I. D. 6 mm.

In the combustion apparatus oxygen is substituted for air in the secondary phase of the burner.

*Vacuum system.*—A suitable vacuum system is used which keeps a constant, uniform vacuum in the absorption and combustion chambers when the flame is burning properly.

*Air supply.*—Compressed air for the primary phase is purified by passing through (*a*) a liquid-gas separator, (*b*) granular bone charcoal, (*c*) heating chamber which heats the air to approximately 500° C., (*d*) cooling system, (*e*) 1.5% hydrogen peroxide gas scrubber, (*f*) 10% sodium hydroxide. The heating tube is constructed of an electric combustion tube furnace in which is placed a one meter length of Vycor glass tubing of I. D. 21 mm., and filled with chips of Vycor glass.

A trap is included between the final air scrubber and combustion chamber to which is connected a pressure relief valve maintaining a pressure of about 60 cm. water. All of the connecting lines are made with Tygon tubing of approximately 9 mm. I. D. except where some of the apparatus requires a smaller size. Between the burner and the trap there is an adjustable hose cock to regulate the flow of air. To maintain the same pressure on the fat as in the combustion chambers and thus assure an optimum supply of fat to the burner, a line connects the primary phase and reservoir of fat. The proper level of fat in the wick is controlled by adjusting the height of the fat reservoir. All connections are kept as short as possible, but long enough to assure easy manipulation.

*Procedure.*—A burner is prepared by plugging the pressure equalizing hole in the bottom of the primary air chamber with a suitable cement such as a litharge-glycerine mixture. The wick used is described in the ASTM reference cited and is prepared to fit snugly in the wick chamber with the protruding end being void of strands. This is accomplished by folding one strand over the end of another (thus three strands parallel) and introducing through the bottom of the burner. The total length is approximately 40 mm. The wick protrudes about 3 mm. above the top of the burner. The burner with wick in place is connected to the fat reservoir, melted fat is added to fill the equipment, plus 5–10 gms. more for burning. The entire assembly is weighed to the nearest 0.01 gm. The difference in weight of this assembly before and after burning is the weight of sample. Twenty-five ml. of 0.1 N sodium hydroxide is introduced into the absorber, the air line is connected to the primary phase on the burner and fat reservoir (top of Erlenmeyer), and the oxygen line is connected to the chimney and to the water manometer. The compressed air is turned on and the wick lighted with a sulfur-free flame. The air supply is regulated with the adjustable hose cock so that a cone of flame develops which is blue on the bottom and yellow at the tip and which just surrounds the wick. The air flow is not so strong as to blow the flame above the top of the burner. Oxygen is very slowly introduced into the secondary phase, and the vacuum is turned on. The burner is introduced into the chimney and necessary adjustments are made so that the flame burns with intense whiteness. The proper flame has a bluish or clear region around the wick which is very sensitive to the air adjustment. The flame is of such brilliance that it is uncomfortable to gaze at with the naked eye. This adjustment of air and oxygen is very important and critical. The size of the flame is not important—only its color and intensity, and its position and shape with respect to the wick. When too much oxygen is introduced, a crust of unburned substances will form over the wick which is difficult to remove by combustion. If too little oxygen is used, the volatilized fat will not completely burn and the flame is yellow. The fat reservoir is adjusted so as to maintain an optimum level in the wick for the entire burning time. A heat lamp is focused on the fat to maintain it in a melted state. The water manometer shows a negative pressure in the combustion chamber at all times. After combustion is completed the burner is removed without turning off the air, oxygen or vacuum and the wick pulled out to approximately 6–7 mm. above the burner top. The lighted burner is again introduced into the chimney, at the same time increasing the flow of oxygen and decreasing the flow of air. The flow of oxygen is increased until the wick is burned off flush with the burner top. This produces an intense heat and cannot be performed long or it will melt the glass, but it does insure complete combustion of some of the less combustible material which tends to remain and concentrate in the wick.

When the equipment has cooled, the chimney and spray trap are rinsed with several portions of distilled water. These rinsings and the absorber contents are passed through a cation exchanger. This exchanger consists of a suitable resin (i. e., Amberlite IR–112 or Chempro C–20) regenerated in the hydrogen cycle as recommended by the manufacturer. A column of resin 230 mm. long and 16 mm. in diameter is suitable. The column is thoroughly flushed with distilled water to assure complete recovery of all the combustion products. The rinsings are collected directly, without exposure to the air, in 5–10 ml. of saturated bromine water to oxidize the products to sulfates. The total volume after this procedure is 200–250 ml. The solution is boiled to reduce the volume to 20–25 ml. and to remove the excess bromine. After transferring to a 125 ml. Erlenmeyer flask, the solution is brought to boiling and 5 ml. of 0.02 N $BaCl_2$ are added. (The total volume at this point is approximately 50 ml.) The flask is placed on a steam bath for approximately 30 minutes and then set aside for 2–3 hours. Approximately one ml. of a versenate buffer is added (The Netherlands Milk and Dairy Journal 8:157 (October/December 1954)) and the excess barium titrated with 0.02 N disodium versenate using three drops of eriochrome black T (The Netherlands Milk and Dairy Journal 8:157 (October/December 1950)) and approximately one ml. of magnesium versenate (equivalent amounts of magnesium chloride and disodium versenate) as indicators. The final disappearance of the reddish hue is the end point. The equivalents of sulfate present are calculated and the final answer is given in parts per million of sulfur in the fat.

The values and calculations for a typical analysis of a sample of milk fat areas follows:

Weight of fat reservoir and burner before burning _____ 112.3
Weight of fat reservoir and burner after burning _____ 106.6

Grams of fat burned _____ 5.7

Volume of 0.02 N disodium versenate used to titrate excess barium _____ml__ 4.95
Milliequivalents of barium added (5.0) (0.02) __ 0.100
Milliequivalents of versene added (4.95) (0.02) __ 0.099
Milliequivalents of barium sulfate _____ 0.001
Grams of $SO_4$=(0.001) (0.048)=0.000048 gms.
Grams of S=0.000016 gms.
Micrograms S=16

$$P.p.m. = \frac{Micrograms\ S}{gm.\ fat} = \frac{16}{5.7} = 2.8\ or\ 3$$

When I wish to analyze any dairy product made by use of my fat product as one of the ingredients, I extract the fat or a portion thereof by use of suitable solvents or combinations of solvents that are free from sulfur containing compounds in such a way that I do not subject the product to elevated temperatures. After separation of the fat from the nonfat portion of the dairy food product the solvent is removed, the moisture and the curd removed and the analysis proceeds.

By means of the analysis described above, I find that anhydrous milk fat made by conventional methods based upon high temperature phase breaking and polishing operations, without the benefit of the inhibitor, produces products containing milk fat with sulfur in quantities as high as 14–20 parts per million, whereas, with the use of the inhibitor and by the avoidance of high temperatures on the serum without the inhibitor a fat is obtained which will range in sulfur content from undetectable amounts which may be called essentially zero up to quantities in the order of one part per million as the maximum usually found when the process is under excellent control, not more than 2½ parts per million when the process is under careful control, and no greater than 4 parts per million of sulfur when the process is under fair control. It is found that a flavor and/or tactual response from the fat is observed that is reasonably in proportion to the quantity of sulfur found in the fat by the method of analysis herein described. It appears however that the conventional procedures for producing dry milk fat do not produce fat with sulfur contents that fall below five parts per million and that the values are usually in the order of 8 to 16 parts per million, or even higher.

It is understood in this discussion that the usual practices of good dairy operation are required to secure the desired results in flavor. Metal contamination must be avoided for best results, foaming should be controlled and unnecessary exposure to air and light is bad practice as in other dairy manufacturing procedures. The dissolved oxygen in the final anhydrous milk fat should be as near zero ml./100 grams of fat as possible and can be consistently held to values not exceeding 0.2 ml./100 grams of fat by careful packaging practices, including protection by means of inert gas.

I have therefore shown in this disclosure:

A. Anhydrous milk fat and milk fat concentrates produced by conventional methods now known to the art, possess a moderate to high degree of off-flavor which I have found to be proportional to the sulfur content of the fat or of the fat isolated from such fat concentrates.

B. The flavor of an anhydrous milk fat may be controlled by using an inhibitor such as is herein described before subjecting milk fat containing materials to damaging levels of heat treatment when in the presence of serum solids.

C. The off-flavor of and the sulfur content of an anhydrous milk fat may be minimized by using methods of production that do not subject the fat in the presence of serum solids to more than minimum temperatures and times required to just pasteurize the product by high temperature short time means.

D. Sterile milk products and milk fat-containing food products may be prepared by the use of my invention by adding the inhibitor to the high fat concentrate before the fat portion is sterilized, sterilizing the high fat portion, blending this portion with the separate stream containing other presterilized ingredients, rendering the combined ingredients homogeneous, if desired, and packaging aseptically.

E. A method in full detail, heretofore not described in the literature, which makes it possible to analyze milk fat successfully for its sulfur content.

Other modes of applying the principle of the invention may be employed, change being made as regards the details described, provided the features stated in any of the following claims or the equivalent of such be employed.

I, therefore, particularly point out and distinctly claim as my invention:

1. A recombined milk product containing as an ingredient anhydrous milk fat which has been heat treated and contains not more than four parts per million of sulfur when analyzed by completely burning said fat and measuring the sulfur evolved therefrom.

2. A recombined milk product containing as an ingredient anhydrous milk fat which has been heat treated and contains not more than two and one-half parts per million of sulfur when analyzed by completely burning said fat and measuring the sulfur evolved therefrom.

3. A recombined milk product containing as an ingredient anhydrous milk fat which has been heat treated and contains not more than one part per million of sulfur when analyzed by completely burning said fat and measuring the sulfur evolved therefrom.

4. A milk fat concentrate, the fat of which has been heat treated and contains not more than four parts per million of sulfur when analyzed by completely burning said fat and measuring the sulfur evolved therefrom.

5. A milk fat concentrate, the fat of which has been heat treated and contains not more than two and one-half parts per million of sulfur when analyzed by completely burning said fat and measuring the sulfur evolved therefrom.

6. A milk fat concentrate, the fat of which has been heat treated and contains not more than one part per million of sulfur when analyzed by completely burning said fat and measuring the sulfur evolved therefrom.

7. A sterile milk product containing as an ingredient a milk fat which is sterilized and contains not more than four parts per million of sulfur when analyzed by completely burning said fat and measuring the sulfur evolved therefrom.

8. A sterile milk product containing as an ingredient a milk fat which is sterilized and contains not more than two and one-half parts per million of sulfur when analyzed by completely burning said fat and measuring the sulfur evolved therefrom.

9. A sterile milk product containing as an ingredient a milk fat which is sterilized and contains not more than one part per million of sulfur when analyzed by completely burning said fat and measuring the sulfur evolved therefrom.

10. An anhydrous milk fat which has been heat treated and contains not more than four parts per million of sulfur when analyzed by completely burning said fat and measuring the sulfur evolved therefrom.

11. An anhydrous milk fat which has been heat treated and contains not more than two and one-half parts per million of sulfur when analyzed by completely burning said fat and measuring the sulfur evolved therefrom.

12. An anhydrous milk fat which has been heat treated and contains not more than one part per million of sulfur when analyzed by completely burning said fat and measuring the sulfur evolved therefrom.

13. A process for preparing a pasteurized milk fat containing not over four parts sulfur per million which comprises the steps of high temperature short time pasteurization of raw whole milk, separation to a fat content of 40% to 80+%, chilling to a temperature below 55° F. and above 32° F. for from thirty minutes to a number of hours, melting under controlled conditions to avoid any temperatures higher than 135° F., separating the fat, heating to a higher temperature in the order of 175° F. to 200° F., then centrifugally polishing and drying by means of heat and vacuum, cooling and suitably packaging, in a hermetically sealed container under an atmosphere of inert gas.

14. The method of claim 13 which the 40% to 80+% fat cream is subjected to high temperature short time pasteurization, after which the emulsion is broken according to the method of claim 13.

15. The process for producing a sterile milk product which comprises the steps of separating the fat component from the bulk of the nonfat components of raw whole milk into two separate component streams, continuously sterilizing said separate component streams, blending the said component streams at a temperature below sterilizing temperatures into a sterile blended product, and continuously packaging said sterile blended product under aseptic conditions in sterile hermetically sealed containers.

16. The process for producing a sterile milk product which comprises the steps of separating the fat components from the bulk of the nonfat components of raw whole milk, adding a sugar as an inhibitor of cooked flavor to the fat components, separately sterilizing said fat components and said nonfat components, blending the sterile fat-components and nonfat components at a temperature below sterilizing temperatures into a sterile blended product, and packaging said sterile blended product under aseptic conditions in sterile hermetically sealed containers.

17. The process of claim 15 in which said sterilization is high temperature short time sterilization in the range from about 250° F. to about 300° F. with the $F_o$ in the range from 5 to 20.

18. The process of claim 16 in which said sterilization is high temperature short time sterilization in the range from about 250° F. to about 300° F. with the $F_o$ in the range from 5 to 20.

References Cited in the file of this patent

UNITED STATES PATENTS

| | | |
|---|---|---|
| 329,778 | Sabin | Nov. 3, 1885 |
| 934,641 | Wagner | Sept. 21, 1909 |
| 1,791,068 | Wendt | Feb. 3, 1931 |
| 2,087,587 | Wendt | July 20, 1937 |
| 2,663,642 | Whitaker et al. | Dec. 22, 1953 |
| 2,673,155 | Turnbow | Mar. 23, 1954 |

OTHER REFERENCES

Harland et al.: J. of Dairy Science, 28, No. 1, pp. 15 to 23.

UNITED STATES PATENT OFFICE
CERTIFICATE OF CORRECTION

Patent No. 2,847,310                                               August 12, 1958

Grover D. Turnbow

It is hereby certified that error appears in the printed specification of the above numbered patent requiring correction and that the said Letters Patent should read as corrected below.

Column 1, line 42, for "necesarily" read -- necessarily --; column 2, line 18, for "preferabl" read -- preferable --; line 34, for "ffavor" read -- flavor --; line 68, for "ercess" read -- excess --; column 5, line 72, after "is" insert -- welded on the bottom and which is --; column 7, line 55, after "4.95" insert -- ml --; column 10, line 8, after "13" insert -- in --.

Signed and sealed this 11th day of November 1958.

(SEAL)
Attest:

KARL H. AXLINE
Attesting Officer

ROBERT C. WATSON
Commissioner of Patents